(12) United States Patent
Fuerle

(10) Patent No.: US 6,526,851 B1
(45) Date of Patent: Mar. 4, 2003

(54) UNDERCUT SCREW AND MATCHING BIT

(76) Inventor: Richard D. Fuerle, 1711 W. River Rd., Grand Island, NY (US) 14072

( * ) Notice: Subject to any disclaimer, the term of this patent is extended or adjusted under 35 U.S.C. 154(b) by 0 days.

(21) Appl. No.: 10/064,150

(22) Filed: Jun. 14, 2002

(51) Int. Cl.[7] .............................................. B25B 23/08
(52) U.S. Cl. ............................ 81/451; 81/441; 81/460; 411/406; 411/407
(58) Field of Search .................... 81/451, 436, 441, 81/460, 186; 411/403, 406, 407, 409, 919

(56) References Cited

U.S. PATENT DOCUMENTS

| 132,946 | A | * | 11/1872 | Arstrong | 411/406 |
| 1,056,095 | A | * | 3/1913 | Gross | 81/436 |
| 1,997,422 | A | * | 4/1935 | Lorenzen et al. | 411/403 |
| 2,301,590 | A | * | 11/1942 | Signorelli | 81/444 |
| 2,304,704 | A | * | 12/1942 | O'Leary | 411/406 |
| 2,631,624 | A | * | 3/1953 | Wright | 81/436 |
| 3,120,251 | A | * | 2/1964 | York | 81/436 |
| 3,897,812 | A | * | 8/1975 | Arnn | 81/436 |
| 3,923,088 | A | * | 12/1975 | Arnn | 81/436 |
| 4,016,912 | A | * | 4/1977 | St-Amour | 81/436 |
| 4,311,071 | A | * | 1/1982 | Bassell | 411/404 |
| 4,339,971 | A | * | 7/1982 | Zatorre | 411/406 |
| 4,538,486 | A | * | 9/1985 | Lutrat | 411/407 |

* cited by examiner

Primary Examiner—James G. Smith
Assistant Examiner—Hadi Shakeri
(74) Attorney, Agent, or Firm—Richard D. Fuerle

(57) ABSTRACT

A screw has a head portion and a threaded portion. The head portion has an undercut slot extending across it. The slot has a flat floor and sloping sides and the width of the floor of the slot is greater than the width at the top opening of the slot. A matching bit has a shank portion and a flat portion. The flat portion of the bit is not as wide as the top opening of the slot. The flat portion has a foot extending from each end. Each foot has a flat base and inwardly-sloping sides

16 Claims, 7 Drawing Sheets

UNDERCUT SCREW AND MATCHING BIT

BACKGROUND OF INVENTION

This invention relates to a novel screw and matching driver bit. In particular, it relates to a screw having an undercut slot in its head and to a bit that engages the slot.

Power screwdrivers are now used more and more, especially when a large number of screws must be fastened. Power screwdrivers can produce greater torque than can a human. But if the driver is not stopped immediately when the bottom of the head of the screw hits the surface into which the screw is being driven, both the slot in the screw and the bit can be stripped, destroying the bit and making it difficult to remove the screw. It is not easy to stop the driver just when the head of the screw contacts the surface, so stripped screws and ruined bits are common. This is especially true of Phillips screwdrivers (X-shaped slots) and square drives (where the slot is a square well) because the bit engages the slot so close to the center of the head of the screw that there is very little turning leverage.

In addition, the torque of the driver tends to force the bit out of the slot, so that the operator must apply considerable pressure to the driver to keep the bit in the slot.

U.S. Pat. No. 5,868,049 shows a screw having an undercut slot in the head and an hourglass-shaped driver bit that engages the slot. However, the slot and driver bit are of a complex design which would be costly to produce.

SUMMARY OF INVENTION

I have invented a screw and driver bit that overcome some of the problems with prior screws and driver bits. The undercut slot in the head of the screw of this invention is a simple, straightforward shape. It is similar to the slot of a regular screwdriver and the screws should cost about as much to make as regular screws. The driver bit, too, is a simple shape, similar to a regular screwdriver, except for a foot at each end.

Unlike some prior screw heads and driver bits, the driver bit of this invention applies torque at or near the periphery of the screw head, not near the center of the screw head. As a result, the turning leverage is greater and there is far less tendency to chew up the screw head and the bit.

The slot in the head of the screw is wide enough for the bit to enter it from directly overhead, without any twisting motions by the operator. When the bit is engaged, it resists removal until the bit stops turning, whether the screw is being driven in or is being removed.

In addition, unlike the design in U.S. Pat. No. 5,868,049, the sides of the slot are not vertical, but are at an angle, with the widest portion of the slot farthest from the head of the screw. As a result, the torque of the driver forces the bit down into the slot, further ensuring that the bit does not disengage from the head while the screw is being driven.

DETAILED DESCRIPTION

Figure 1:
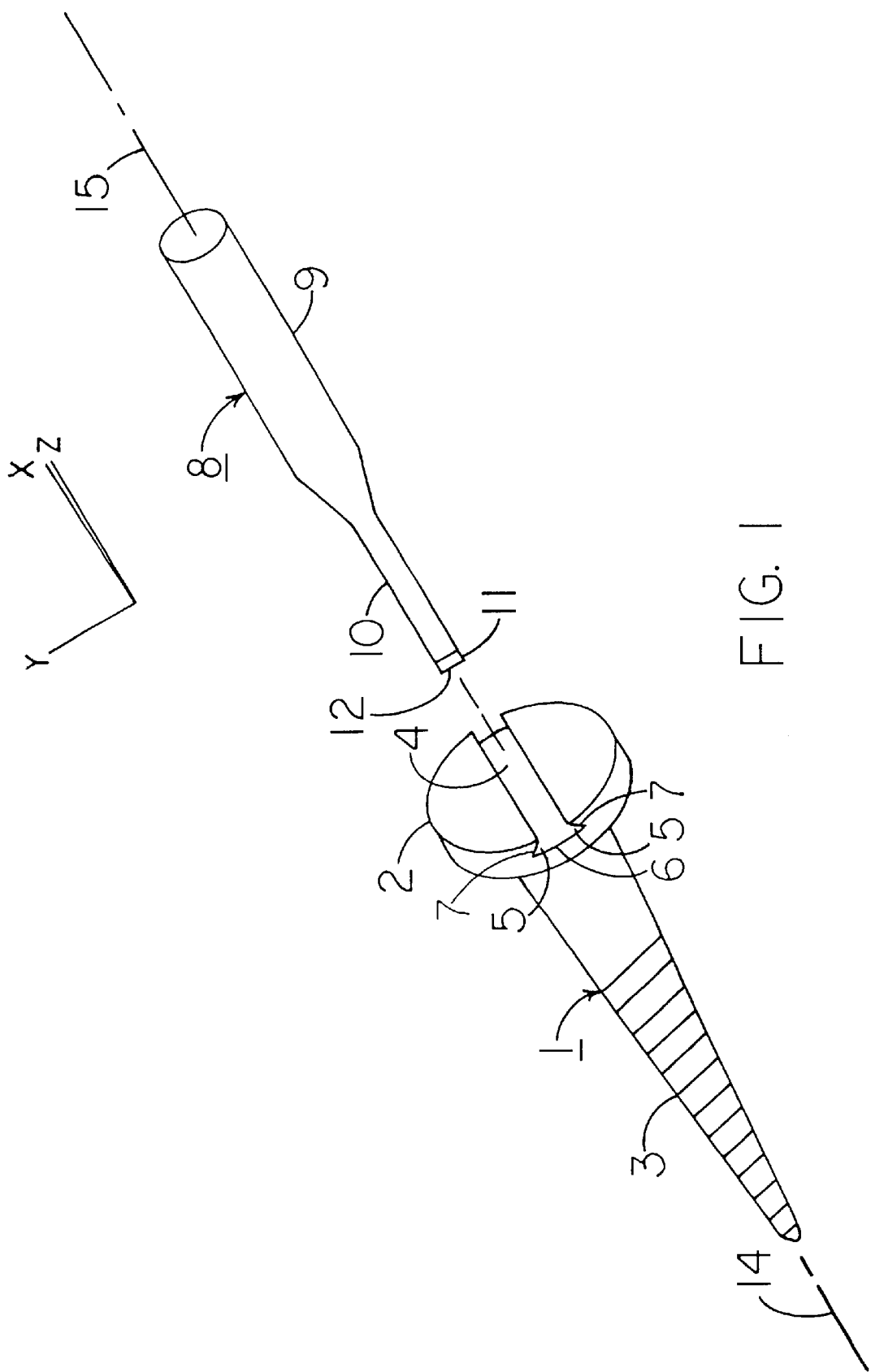
FIG. 1 is a isometric view illustrating a certain presently preferred embodiment of a screw and corresponding driver bit according to this invention.

In FIGS. 1, 2, 3, 4, and 5, a pan head screw 1 has a head 2 and threads 3. Cut through a diameter of head 2 is a slot 4 having undercut portions 5. Slot 4 has a flat floor 6 perpendicular to the axis of said screw and non-vertical sides 7.

Driver bit 8 has a shank 9, which can be round, hexagonal, or other shape in cross-section. Shank 9 can be grasped by a chuck (not shown) of a driver, such as an electric screwdriver (not shown). Alternatively, shank 9 can be grasped and turned by hand. If bit 8 is to be inserted into a chuck, shank 9 would typically have a diameter of about ¼ inch, but if shank 9 is to be turned by hand it would typically have a diameter of about ¾ to about 1½ inches.

Fixed to shank 9 is a flat blade 10 which has a V-shaped foot 11 extending from each end. Each foot 11 has a flat base 12 perpendicular to the axis of said bit and inwardly-sloping sides 13 that match the shape of slot 4. The ends of feet 11 are at an angle β to blade 10 (see FIG. 5) so that they can engage head 2 for a distance that is greater than the length of blade 10. Angle β is greater than 0° and less than 90° and is preferably about 10° to about 30°. Bit 8 is designed to be used with screws driven by a clockwise rotation. For screws driven by a counterclockwise rotation, feet 11 would face in the opposite direction. Screw 1 has a longitudinal axis 14 and bit 8 has a longitudinal axis 15.

Figure 3:
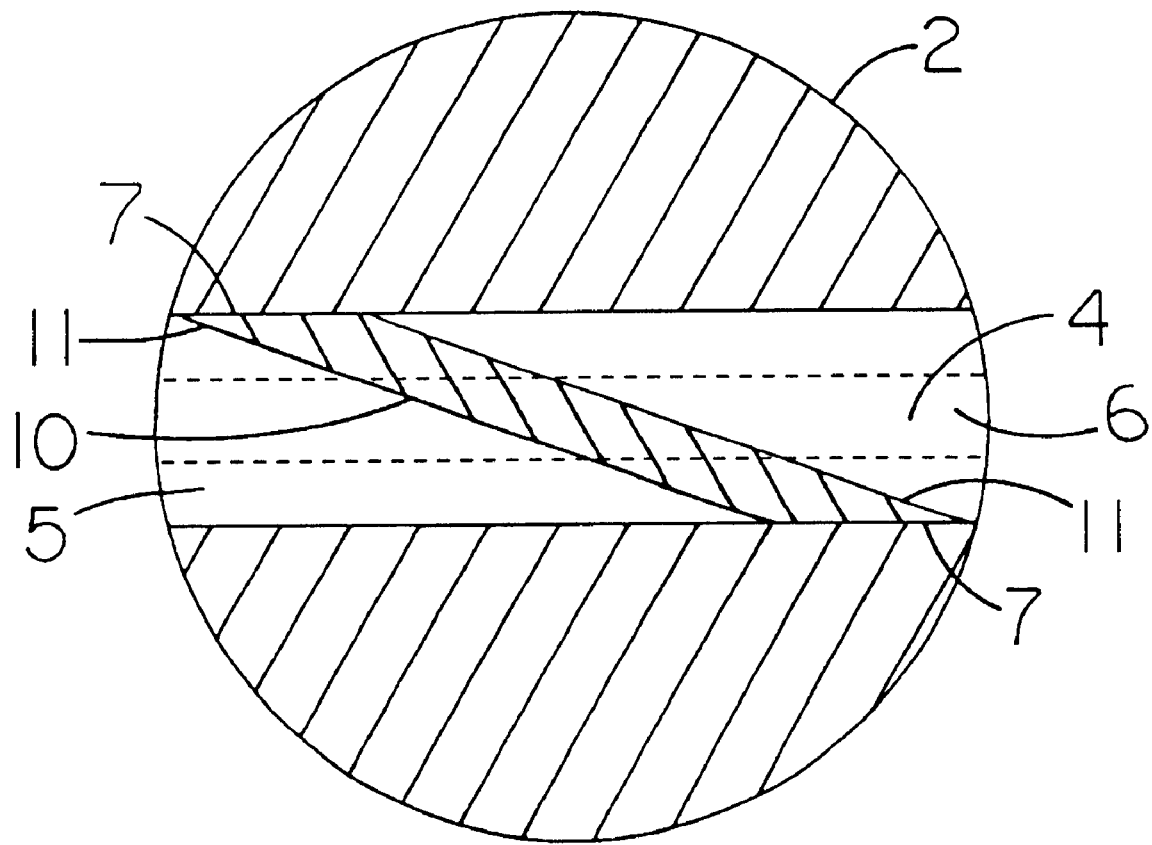
FIG. 3 is a plan view through section III—III in FIG. 2.
Figure 4:
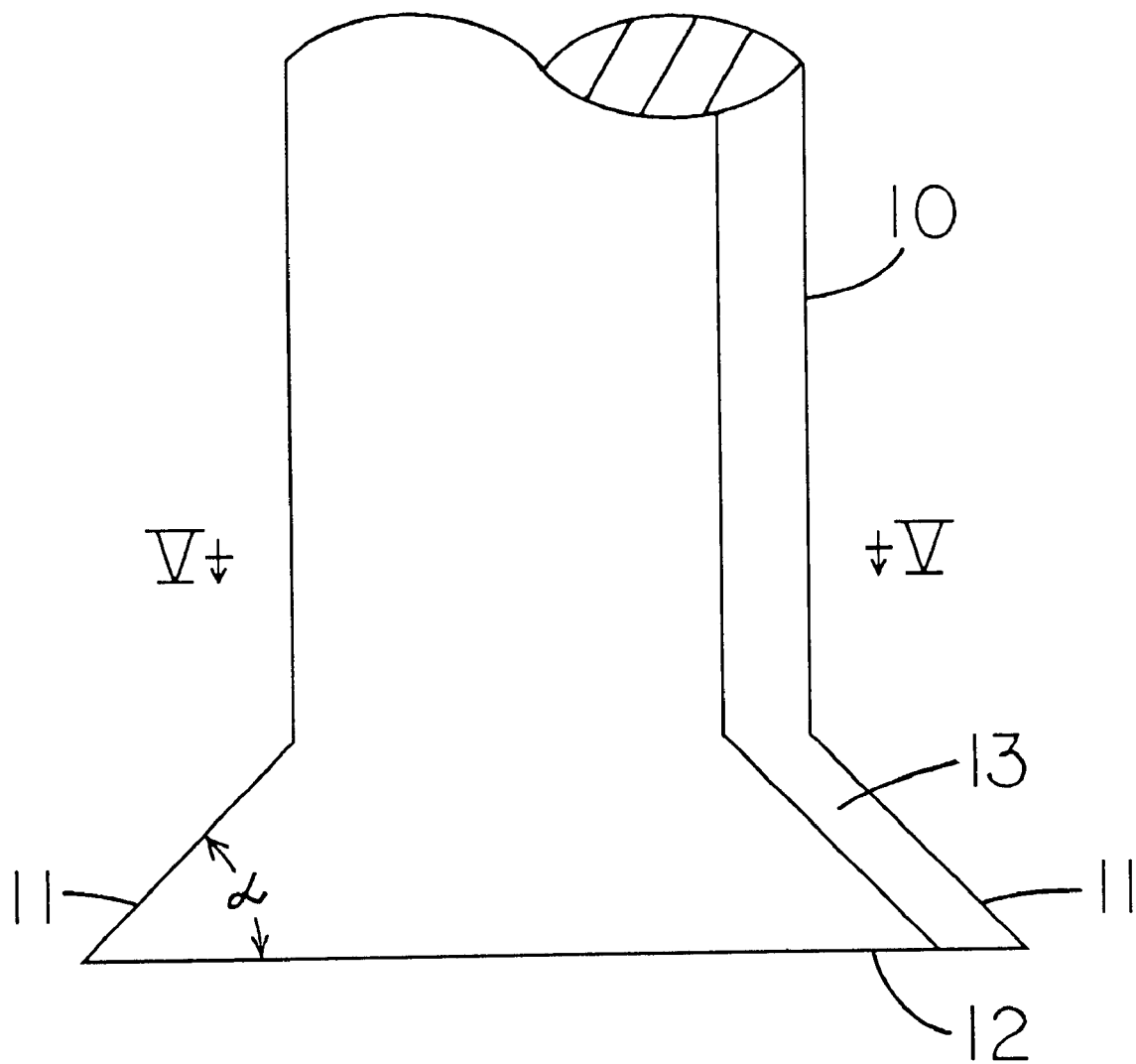
FIG. 4 is a partially cut away front view of the blade of the bit of FIG. 1.
Figure 5:
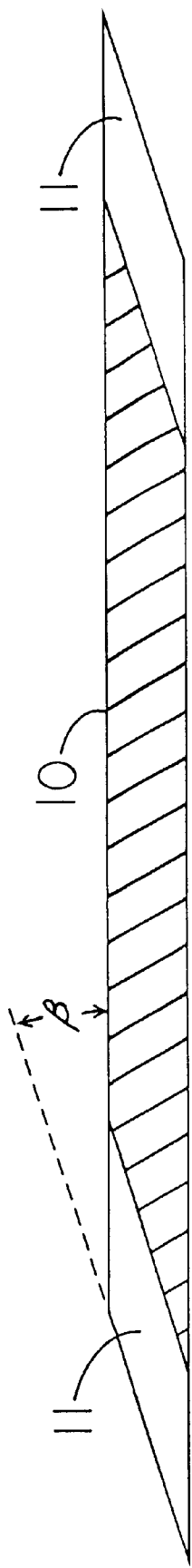
FIG. 5 is a plan view through section V—V of FIG. 4.

FIG. 3 shows that feet 11 contact sides 7 of slot 4 at or near the periphery of head 2 so that bit 8 exerts the maximum possible leverage on screw 1.

Figure 2:
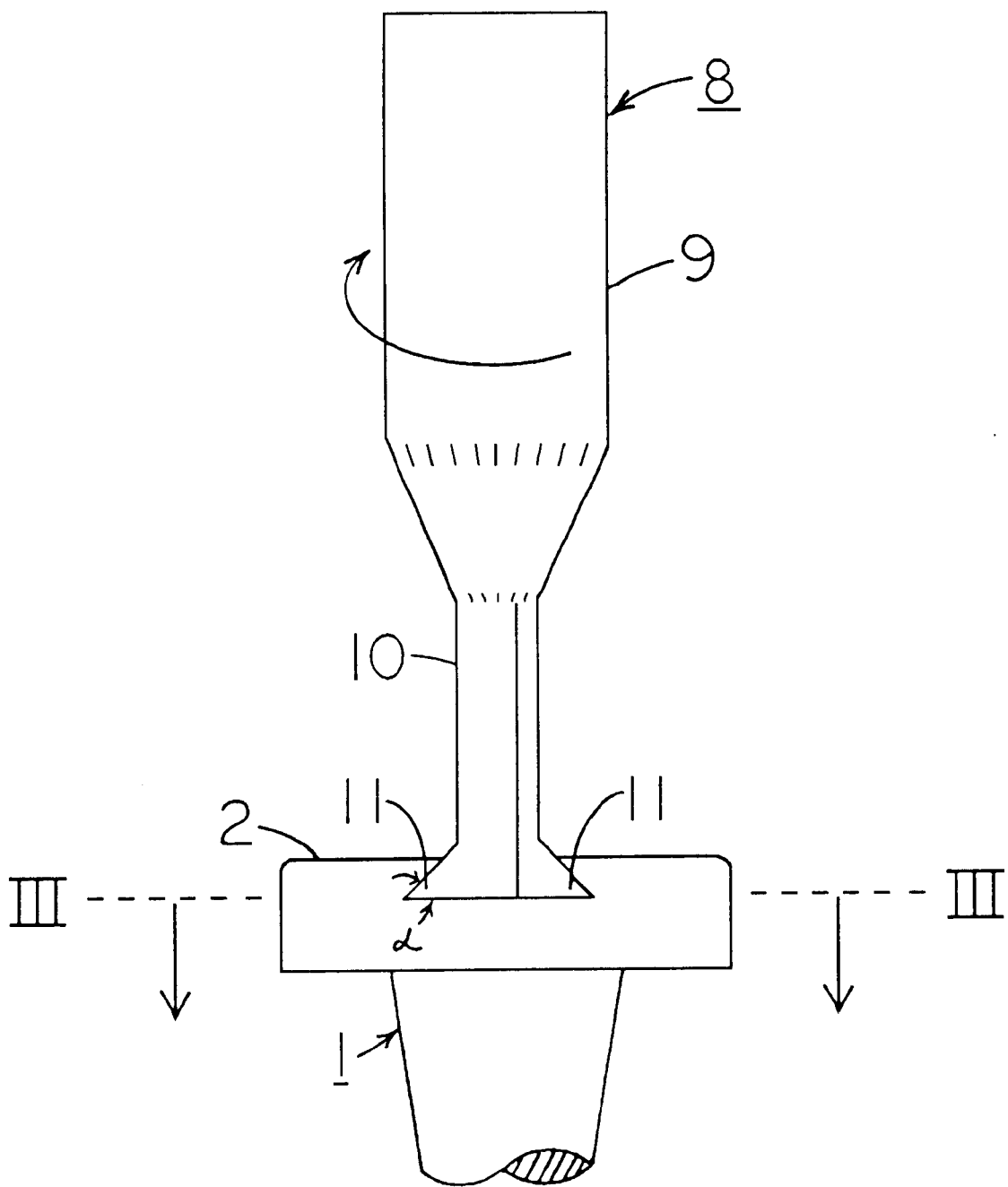
FIG. 2 is a side view of the screw (partially cut away) and bit of FIG. 1 in an engaged position.

FIG. 2 shows that because walls 7 are sloped, foot 11 is forced down into slot 4 by torque applied to bit 8.

The width of blade 10 is less than the width of the top opening of slot 4 so that blade 10 can be slipped directly into slot 4. Slot 4 may have any dimensions appropriate for the type of screw to be used. Typically, the top opening of slot 4 will have a width of about 1/32 to about ¼ inches and slot 4 will be about 1/32 to about ¼ inch deep. The walls can be sloped at any angle α (FIG. 2) that is greater than 0° and less than 90°. Preferably, slot 4 is about 1/16 to about ⅛ inches wide at its top opening, has a depth of about 1/16 to about ⅛ inches, and the angle α is about 30° to about 60°.

Figure 6:
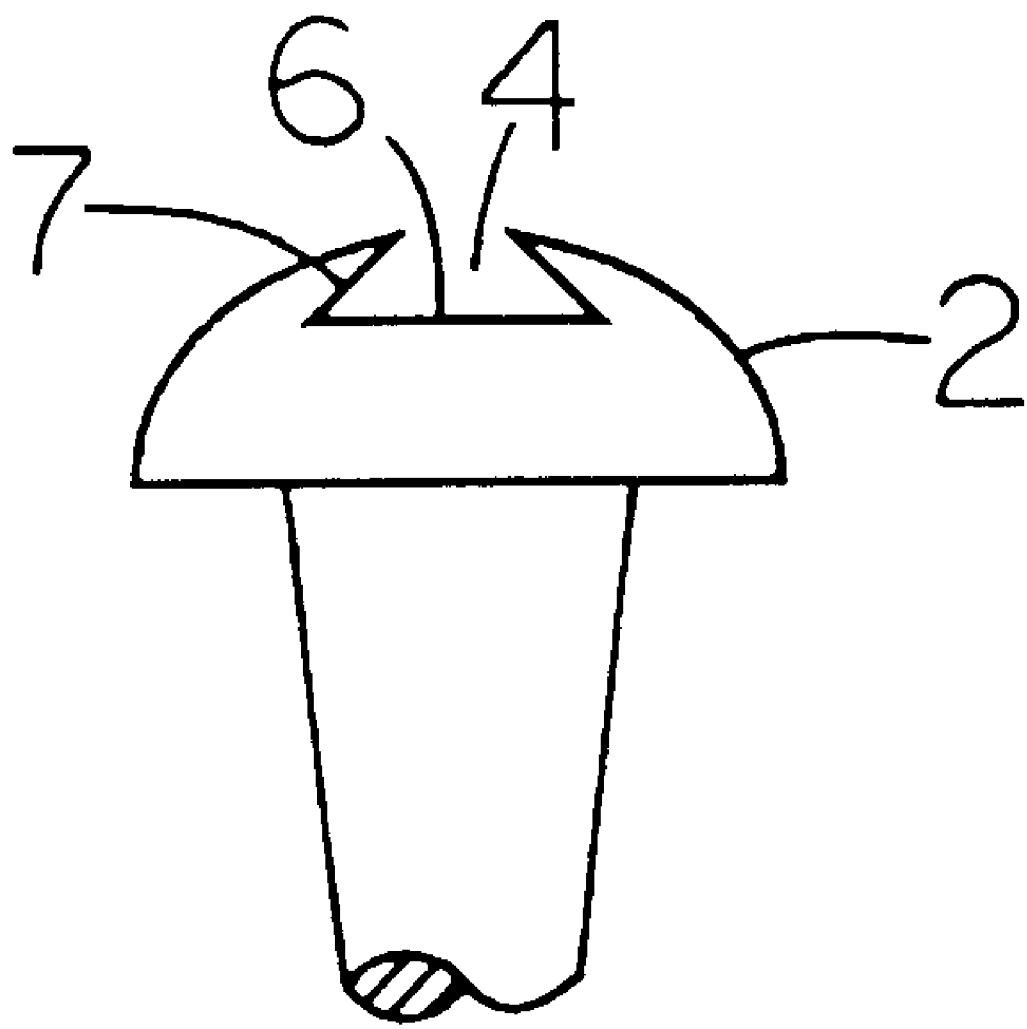
FIG. 6 is a partially cut away side view of a round head screw according to this invention.
Figure 7:
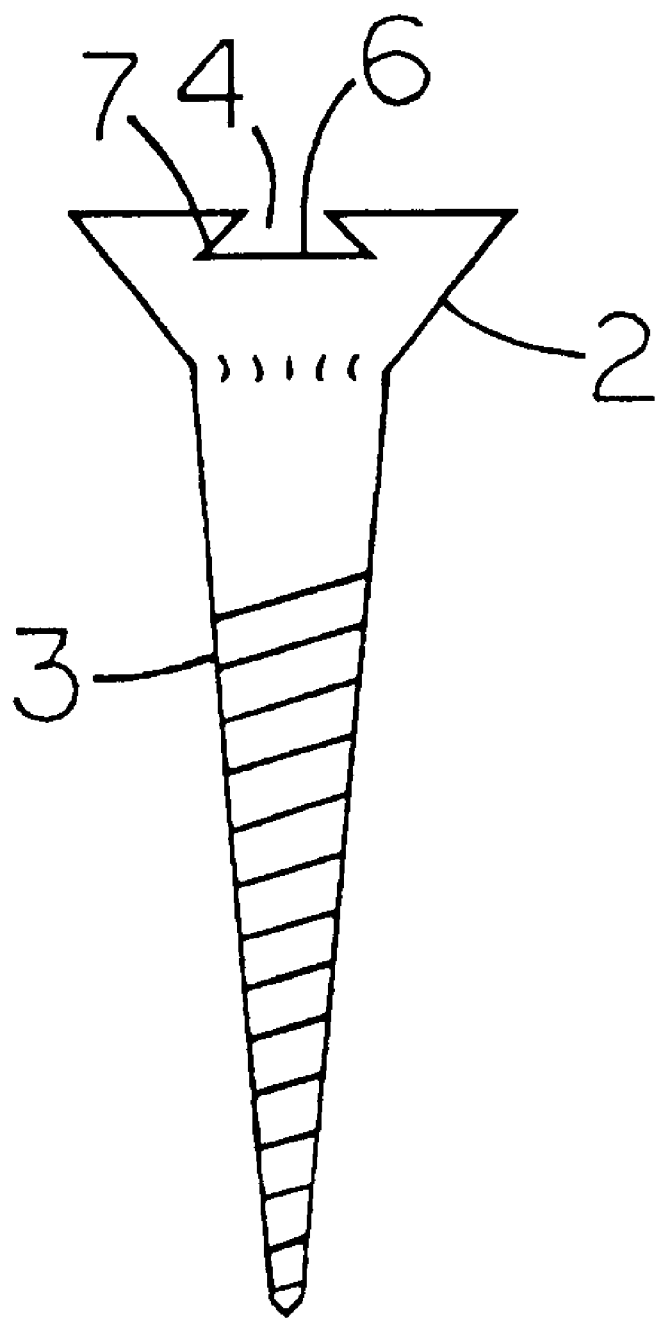
FIG. 7 is a side view of a flat head screw according to this invention

FIGS. 6 and 7 show a round head screw and a flat head screw, respectively, similar to the pan head screw of FIGS. 1, 2, and 3.

To use the screw and bit of this invention, the bit is placed in the chuck of a driver or the shank is grasped, the screw is positioned, the bit inserted into the slot, and the bit is rotated. To remove a screw, the bit is inserted into the slot and the direction of rotation is reversed. As the drawings indicate, contact between feet 11 and head 2 is more limited when the screw is being withdrawn. However, less torque is required to remove a screw and removal is required less frequently.

What is claimed is:

1. A bit extending in a Z-axis direction for engaging and turning a screw about said axis, where said screw has a V-shaped undercut in its head, said bit comprising a shank portion and a flat portion, said flat portion having a thickness in a Y-axis direction and a length in an X-axis direction longer than said thickness and terminating in an end portion, said end portion having two opposing feet for engaging said screw, where each foot extends from said flat portion in the X-axis direction, has the same thickness in the Y-axis direction as said flat portion, and has the same V shape as said undercut to engage said screw.

2. A bit according to claim 1 wherein said shank portion has a diameter of about ¼ inch.

3. A bit according to claim 1 wherein said shank portion has a diameter of about ¾ to about 1½ inches.

4. A screw and matching bit combination comprising (A) a screw rotatable about an axis in a Z-axis direction that has a V-shaped undercut in its head; and (B) a bit extending In the Z-axis direction for engaging and turning said screw, said bit comprising a shank portion and a flat portion, said flat portion having a thickness in a Y-axis direction and a length in an X-axis direction longer than said thickness and terminating in an end portion, said end portion having two opposing feet for engaging said screw, where each foot extends from said flat portion in the X-axis direction, has the same thickness in the Y-axis direction as said flat portion, and has the same V shape as said undercut to engage said screw.

5. A bit having a longitudinal axis in a Z-axis direction, comprising a shank portion and a flat portion, said flat portion comprising a middle portion and an end portion that can engage a screw having an undercut head, where said middle portion is between said shank portion and said end portion and said end portion terminates in a base perpendicular to said longitudinal axis, a cross-section in an X-Y plane through said middle portion has the shape of a first parallelogram without right angles and a cross-section in the X-Y plane through said end portion has the shape of a second parallelogram without right angles, the corresponding angles in said first and second parallelograms are equal, said first and second parallelograms have two short sides and two long sides, the lengths of the short sides of said first and second parallelograms are equal, and the length of said long sides of said second parallelogram increases linearly from said middle portion to a greater length at said base than the length of said long sides of said first parallelogram, thereby forming a sloping edge from said base to said middle portion, where the angle between said sloping edge and said base is $\alpha$.

6. A bit according to claim 5 wherein two of the angles in said parallelograms are between about 10° and about 30°.

7. A bit according to claim 5 wherein angle $\alpha$ is between about 30° and about 60°.

8. A bit according to claim 5 wherein said short sides of said parallelogram engage said screw when said bit is turned clockwise.

9. A bit according to claim 5 wherein said shank portion has a diameter of about ¼ inch.

10. A bit according to claim 5 wherein said shank portion has a diameter of about ¾ to about 1½ inches.

11. A bit according to claim 1 wherein said foot engages said screw when said bit is turned clockwise.

12. A bit according to claim 1 wherein the angle that forms said V shape is between about 30° and about 60°.

13. A screw and matching bit combination according to claim 4 wherein said shank portion has a diameter of about ¼ inch.

14. A screw and matching bit combination according to claim 4 wherein said shank portion has a diameter of about ¾ to about 1½ inches.

15. A screw and matching bit combination according to claim 4 wherein said foot engages said screw when said bit is turned clockwise.

16. A screw and matching bit combination according to claim 4 wherein the angle that forms said V shape is between about 30° and about 60°.

* * * * *